(12) United States Patent
Kulai et al.

(10) Patent No.: US 11,729,178 B2
(45) Date of Patent: Aug. 15, 2023

(54) SYSTEMS AND METHODS FOR GENERATING ACCOUNT PERMISSIONS BASED ON APPLICATION PROGRAMMING INTERFACE INTERACTIONS

(71) Applicant: SHOPIFY INC., Ottawa (CA)

(72) Inventors: Sandesh Kini Kulai, Ottawa (CA); Brian Swan, Ottawa (CA)

(73) Assignee: SHOPIFY INC., Ottawa (CA)

( * ) Notice: Subject to any disclaimer, the term of this patent is extended or adjusted under 35 U.S.C. 154(b) by 261 days.

(21) Appl. No.: 17/168,675

(22) Filed: Feb. 5, 2021

(65) Prior Publication Data

US 2022/0255943 A1 Aug. 11, 2022

(51) Int. Cl.
*H04L 9/40* (2022.01)
*G06Q 40/02* (2023.01)

(52) U.S. Cl.
CPC ........ *H04L 63/102* (2013.01); *H04L 63/0892* (2013.01); *H04L 63/105* (2013.01); *G06Q 40/02* (2013.01)

(58) Field of Classification Search
CPC . H04L 63/102; H04L 63/0892; H04L 63/105; G06Q 40/02
See application file for complete search history.

(56) References Cited

U.S. PATENT DOCUMENTS

| 10,148,701 | B1 | 12/2018 | Hecht et al. | |
| 2007/0289024 | A1* | 12/2007 | Mohammed | G06F 21/604 726/28 |
| 2016/0019401 | A1* | 1/2016 | Kumar | G06F 21/6272 726/30 |
| 2020/0120138 | A1 | 4/2020 | Sanders et al. | |
| 2020/0204558 | A1* | 6/2020 | Kurmi | H04L 63/20 |

OTHER PUBLICATIONS

Machine Translation of CN 109543411A (Year: 2019).*

* cited by examiner

*Primary Examiner* — Brian F Shaw

(57) ABSTRACT

Systems and methods for generating account permissions for an account on a computing system are provided. In some embodiments, application programming interface (API) interactions involving an external application and the computing system are used to generate a corresponding set of account permissions for the account. API permissions for the external application may also or instead be used to generate the set of account permissions for the account. The set of account permissions may enable the account to access the same resources on the computing system as the external application, which may avoid granting the account overly broad access to the computing system.

25 Claims, 8 Drawing Sheets

FIG. 2

E-Commerce Platform | 🔍 Search | JG John's Apparel / Jonny B. Good

- 🏠 Home
- 🧾 Orders
- 🏷 Products
- 👥 Customers
- 📊 Reports
- ⊗ Discounts
- ⊞ Apps SALES CHANNELS ⊕
- 🏬 Online Store
- 📱 Mobile App View all channels ⚙ Settings Good afternoon, Jonny B..
Here's what's happening with your store today.

Today's total sales    Today's visits
$98.00                 1

- Update your Platform Payments tax details
  We require additional information to verify your identity.
  [Update tax details]

- Advanced Cash on Delivery has been deactivated for your store
  [See why]

All channels ⌄ | Today ⌄

TOTAL SALES
$98.00

$125
$75
$25
         12am   4pm   8pm   11pm
                              Jun 1
                              2 orders TOTAL SALES BY CHANNEL    View dashboard Online Store                        Jun 1
$0.00                            0 orders Mobile app
$0.00                            0 orders Shopify POS (126 York St.)
$0.00                            0 orders

SYSTEMS AND METHODS FOR GENERATING ACCOUNT PERMISSIONS BASED ON APPLICATION PROGRAMMING INTERFACE INTERACTIONS

FIELD

The present application relates to account-based authorization on a computing system and, in particular embodiments, to generating account permissions for an account on a computing system based on interactions with an application programming interface (API).

BACKGROUND

Some software instances that are supported by a computing system may be restricted to certain users. An administrator of an online store on an e-commerce platform is an example of a software instance that is typically restricted to a single user or a single group of users. For example, resources that are accessible through the administrator may enable access to sensitive information that should not be shared with a third-party. However, completely restricting a third-party from the administrator of the online store may hinder support and development for the online store.

SUMMARY

Third-party account permissions may be provided by a computing system to enable a third-party to access a set of resources on the computing system. In some cases, the third-party may offer technical and/or business support services in relation to an external application that supplements or otherwise enhances the functionality of the computing system. For example, the third-party may be the developer of the external application, and the external application may be implemented by a software instance associated with a user of the computing system. To provide the user with appropriate support for the external application, the third-party may be provided with account permissions that enable at least some access to the software instance associated with the user. However, these account permissions might be limited to the portions of the software instance that are relevant to the external application. For example, if the external application does not access certain resources of the software instance, then the account permissions for the third-party might not include access to those resources.

In some embodiments, the external application may interact with the computing system via an interface, such as an application programming interface (API), for example. The account permissions for the third-party may be generated based on an API scope of the external application. The API scope of the external application indicates the resources of the computing system and/or the resources of one or more software instances on the computing system that are relevant to the external application. According to one example, the API permissions granted to the external application (for example, the API calls that the external application is authorized to make) may be used to help determine the API scope of the external application. Additionally or alternatively, the API interactions involving the external application (for example, the actual API calls made by the external application) may be used to help determine the API scope of the external application. As such, the API scope of an external application may include API permissions for the external application and/or API interactions involving the external application.

The account permissions for a third-party providing support for an external application may be generated such that they are commensurate with the API scope of the external application. For example, the API scope may indicate a set of resources of the computing system that is accessed by the external application, and the account permissions for the external application may be generated to allow access to the same set of resources.

Determining third-party account permissions based on the API scope of an external application may be performed automatically by a computing system, and therefore may reduce or remove the need to manually generate third-party account permissions. In this way, account permissions may be generated more rapidly using an API scope and may allow users to quickly access third-party support services. Further, generating third-party permissions based on an API scope may remove human judgement and bias, and therefore may provide account permissions that are more appropriate in scope than manually selected account permissions.

According to an aspect of the present disclosure, there is provided a computer-implemented method that includes obtaining a record of API interactions involving a software application accessing a set of resources of a computing system. The method also includes generating a set of account permissions for an account based on the record of API interactions. The set of account permissions allows that account to access the set of resources of the computing system. Optionally, the set of resources may include data that is accessible via API calls in the record of API interactions. The set of account permissions might also restrict the account's access to other resources of the computing system that do not correspond to the record of API interactions. This method may help ensure that the account and the software application have access to the same set of resources of the computing system, which may avoid granting the account overly broad access to the computing system. The account may allow a user to access the computing system, for example, to provide support for the software application.

In some embodiments, generating the set of account permissions for the account includes mapping a particular API interaction in the record of API interactions to a particular resource of the set of resources of the computing system, and adding at least one permission to the set of account permissions that enables the account to access the particular resource. Optionally, mapping the particular API interaction to the particular resource is based on a stored mapping between portions of an API and resources of the computing system.

In some embodiments, the set of account permissions are temporally dependent. For example, obtaining the record of API interactions may include obtaining a time period for a particular API interaction. If a particular resource that is mapped to the particular API interaction enables access to a data set on the computing system, then at least one account permission may limit the account's access to portions of the data set that correspond to the time period.

In some embodiments, the set of account permissions are generated in a workflow-based manner. For example, generating the set of account permissions for the account may include mapping a group of API interactions in the record of API interactions to a workflow of the computing system, and adding at least one permission to the set of account permissions that enables the account to perform the workflow. Optionally, mapping the group of API interactions to the workflow is based on a stored mapping between portions of an API and workflows of the computing system.

In some embodiments, the set of account permissions allows the account to access a software instance on the computing system that is associated with the software application. For example, the software instance may implement the software application. Further, the set of resources may be specific to the software instance and the set of account permissions may be limited to the software instance. In other words, the set of account permissions might not allow access to other software instances on the computing system. Optionally, before generating the set of account permissions, the method may further include determining that a relationship exists between the software instance and the account.

In some embodiments, obtaining the record of API interactions includes monitoring API calls received by the computing system from an external device executing the software application.

In some embodiments, the method further includes obtaining a record of API permissions for the software application. Generating the set of account permissions for the account may be further based on the record of API permissions.

According to another aspect of the present disclosure, there is provided a system including a memory to store records of API interactions, records of API permissions and/or API mappings, and one or more processors to perform any method as disclosed herein.

According to a further aspect of the present disclosure, there is provided a non-transitory computer readable medium storing computer executable instructions which, when executed by a computer, cause the computer to perform any method disclosed herein.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

For illustrative purposes, specific example embodiments will now be explained in greater detail below in conjunction with the figures.

Example E-Commerce Platform

In some embodiments, the methods disclosed herein may be performed on or in association with a commerce platform, which will be referred to herein as an e-commerce platform. Therefore, an example of an e-commerce platform will be described.

Figure 1:
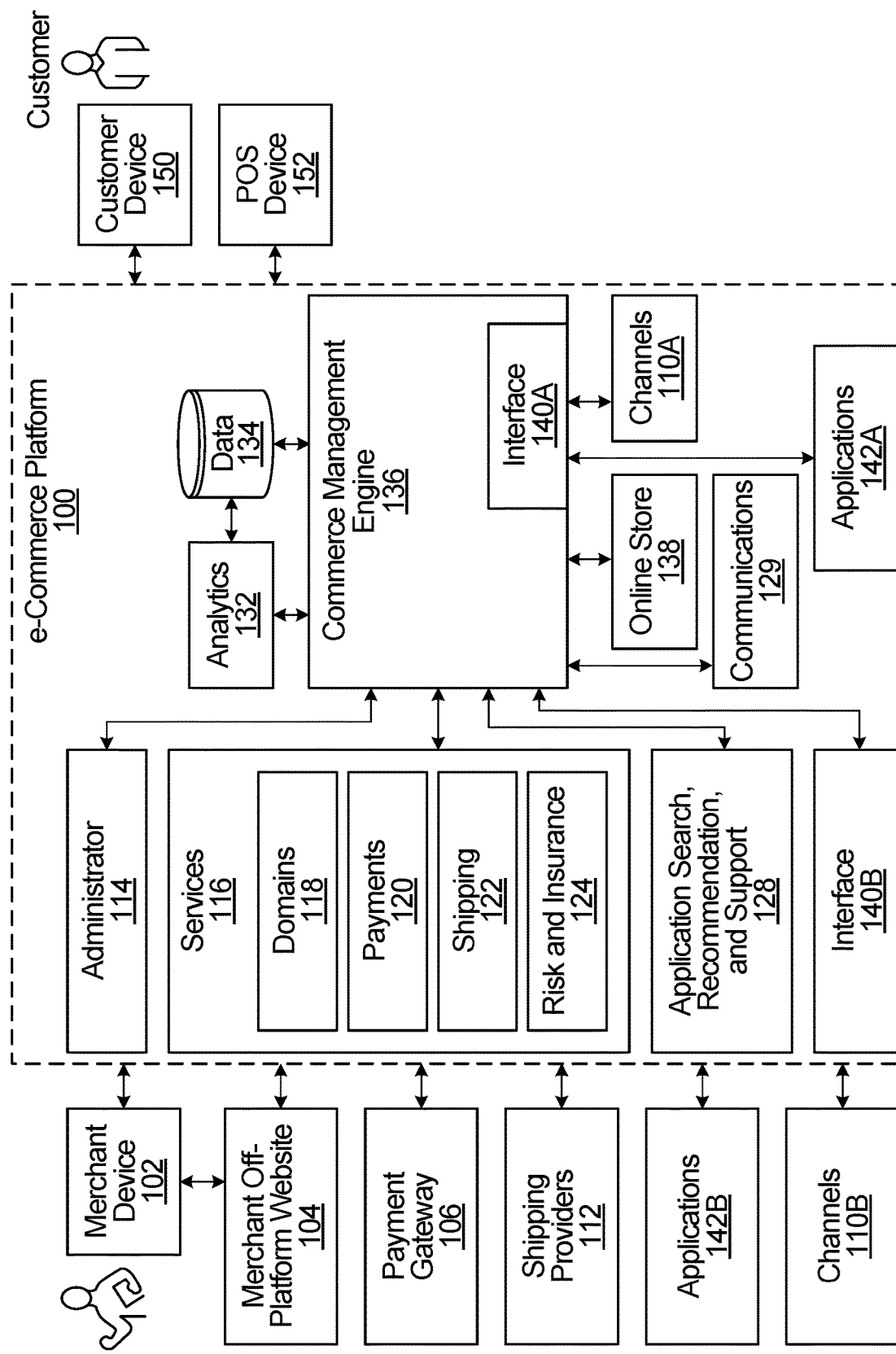
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Third-Party Account Permissions

The e-commerce platform 100, as well as other computing systems that offer software-as-a-service (SaaS), may allow third-party developers to enhance and/or supplement the services that are available to users. For example, third-party developers may provide software applications (which are also referred to as "external applications" and "third-party applications") that are available to users of a computing system. The third-party developers are generally separate from the computing system, and may be referred to as "partners" or "collaborators" of the computing system.

As outlined above, the applications 142B of FIG. 1 are examples of external applications that may enhance and/or supplement the functionality of the e-commerce platform 100. For example, merchants may use applications 142B to help tailor the services provided by the e-commerce platform 100 to meet their individual needs. Some external applications may provide customer-facing features that enhance the functionality of a merchant's storefront, such as the online store 138, for example. Alternatively or additionally, external applications may provide merchant-facing features that help the merchant more efficiently manage their business. For example, these external applications may provide advanced analytics that enhance the functionality of the administrator 114 of FIG. 1.

A potential problem with external applications implemented at an e-commerce platform may arise when a merchant requires support for an external application. Because the e-commerce platform is typically not the developer of the external application, the e-commerce platform might not be able to offer support that addresses the full spectrum of issues that merchants may encounter when utilizing the external application. Non-limiting examples of support for external applications include technical support and business-orientated support. A third-party developer of an external application, however, may be able to offer support to a merchant in relation to their application. Further, the merchant may engage with other third-party support services, which are separate from the e-commerce platform and from the developer of the external application, to help navigate issues with the external application. These third-party support services may be located by the merchant through a technical support marketplace. For example, third-party support services may be available through the application search, recommendation and support 128 of the e-commerce platform 100.

In general, when used herein in the context of e-commerce platforms and other computing systems, a "third-party" is any individual, company, corporation and the like that is separate from a computing system and is not an end user of the computing system. Third-party application developers and third-party support services are examples of third-parties, but other examples are also contemplated.

When a merchant is receiving support for an external application from a third-party, whether they are a third-party application developer or a third-party support service, the third-party may require at least some access to a software instance associated with the merchant on the e-commerce platform. This software instance may correspond to the merchant's online store, for example. Third-party access to a software instance associated with a merchant may include access to resources of the merchant's administrator, which may help the third-party assess the merchant's issue and provide the merchant with a suitable solution. For example, the third-party may be able to see which merchant configurations have been enabled (either on the external application itself or on the e-commerce platform) which may be affecting the behaviour of the external application. Third-party access to a software instance associated with a merchant on an e-commerce platform may be referred to as "collaborator access".

If third-party access to a software instance associated with a merchant on an e-commerce platform is not carefully administered, then a third-party may abuse this access. A possible example of such abuse is the third-party copying assets from the merchant's online store, including product information (to help the third-party start a competing store, for example) and/or customer information (such as personally-identifiable information (PII) that the third-party may sell, for example). To reduce abuse, the account permissions that define a third-party's access to a software instance should be carefully selected and implemented.

Manually selecting third-party account permissions can have significant drawbacks. Consider an example in which a merchant manually selects the account permissions that define a third-party's access to their software instance on an e-commerce platform. The merchant might not fully appreciate the risks associated with granting the third-party too broad of access, and may therefore be too lenient when selecting the account permissions. Alternatively, the merchant may be too cautious when selecting account permissions, to the point where the third-party cannot effectively offer support. In another example, an employee of the e-commerce platform may be tasked with manually selecting the account permissions that define a third-party's access to a software instance. While the employee may understand the risks of granting too much or too little access to the third-party, the employee might not understand the technical issue well enough to make an informed decision as to what scope of permission is appropriate. As such, the employee might rely too heavily on the requests made by the third-party. In a third example, the third-party developer may request a certain set of account permissions directly, optionally subject to approval from a merchant or an employee of the e-commerce platform. While the third-party developer is best able to understand the issue and therefore the level of access required to address it, this does not solve the issue of abuse, as the third-party developer may deliberately request too much access in order to perform an unrelated malicious action. The third-party might also request too much access non-maliciously. For example, a third-party might inadvertently request too much access.

Additional issues also exist when manually selecting account permissions for a third-party. In some cases, the scope and functionality of an external application may change significantly over time, which results in significant changes to the account permissions that a third-party may require to provide support for the external application. Manually reviewing and altering the permissions associated with an external application every time that the application is updated may be an arduous and time-consuming process. Furthermore, the manual selection of account permissions may be a slow process that could ultimately delay a merchant's access to effective support and/or features on offer by the third party.

While the challenges associated with generating third-party account permissions are generally described above in relation to an e-commerce platform, it should be noted that similar challenges may be faced by other computer systems, including social media platforms, financial platforms and healthcare platforms, for example. A need exists for systems and methods to automate the process of generating account permissions to efficiently enable third-party access to software instances on a computing system, while ensuring that the account permissions are appropriate in scope.

Figure 3:
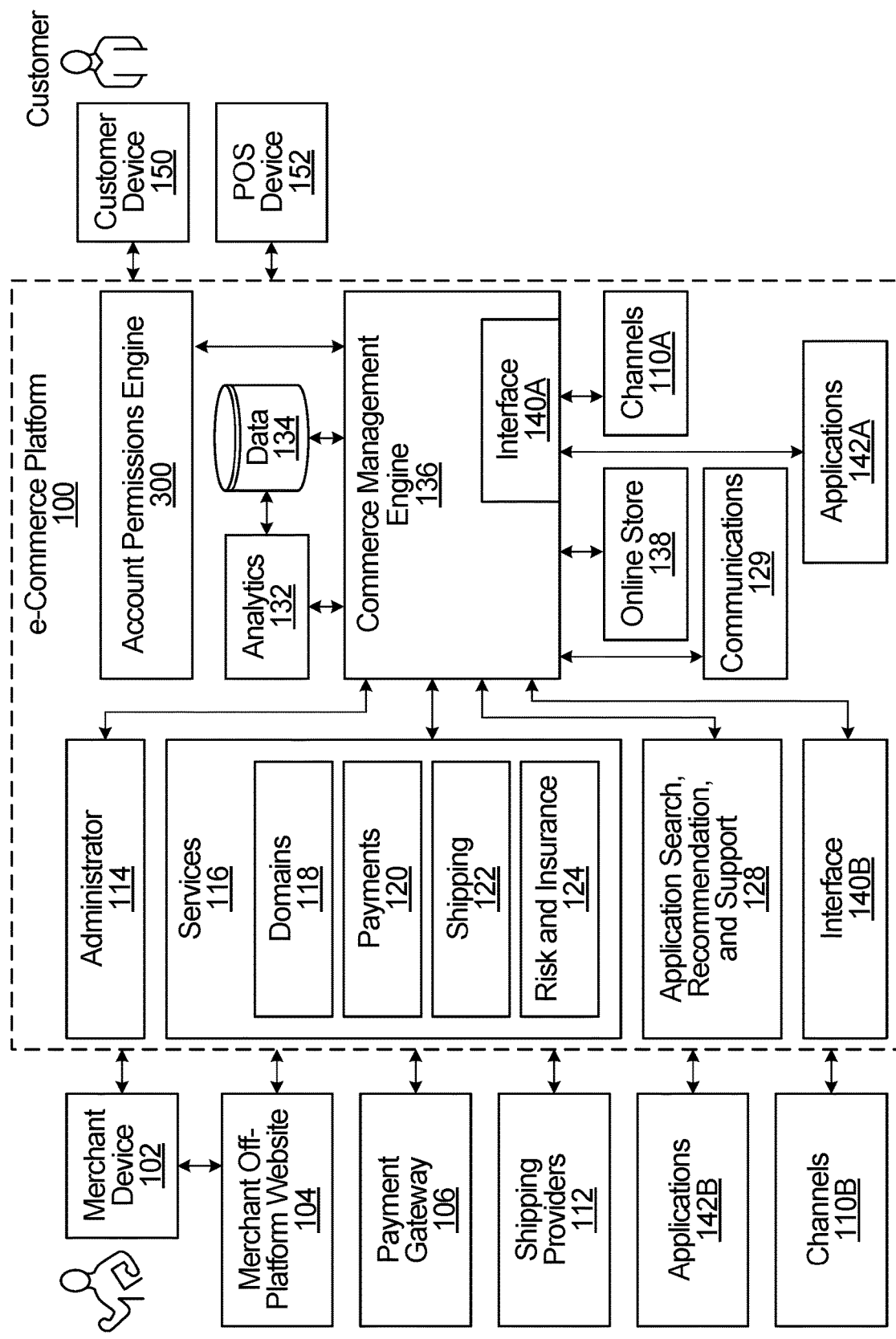
FIG. 3 illustrates the e-commerce platform of FIG. 1, but including an account permissions engine.

FIG. 3 illustrates the e-commerce platform 100 of FIG. 1, but including an account permissions engine 300. The account permissions engine 300 is an example of a computer-implemented system for generating account permissions for third-parties, such as third-party application developers and/or third-party support services, for example. In some implementations, the account permissions engine 300 automatically generates account permissions to enable third-party access to software instances associated with merchants on the e-commerce platform 100. As such, the account permissions engine 300 may reduce or remove the need to manually select third-party account permissions. Further details regarding an account permissions engine can be found elsewhere herein.

Although the account permissions engine 300 is illustrated as a distinct component of the e-commerce platform 100 in FIG. 3, this is only an example. An account permissions engine could also or instead be provided by another component of the e-commerce platform 100 or offered as a stand-alone component or service that is external to the platform 100. In some embodiments, the commerce management engine 136 provides an account permissions engine. The e-commerce platform 100 could include multiple account permissions engines that are provided by one or more parties. The multiple account permissions engines could be implemented in the same way, in similar ways and/or in distinct ways.

The account permissions engine 300 could implement at least some of the functionality described herein. Although the embodiments described below may be implemented in association with an e-commerce platform, such as (but not limited to) the e-commerce platform 100, the embodiments described below are not limited to the specific e-commerce platform 100 of FIGS. 1 to 3. Further, the embodiments described herein do not necessarily need to be implemented in association with or involve an e-commerce platform at all. Other computing systems could implement the embodiments disclosed herein. Examples of such computing systems include social media platforms, financial platforms and healthcare platforms, to name but a few.

Account Permissions Based on API Scope

As outlined elsewhere herein, external applications may interact with a computing system via an interface. By way of example, the interface 140B of FIG. 1 may enable the applications 142B to interact with the e-commerce platform 100. An application programming interface (API) is an example of an interface that may be implemented by a computing system. Through an API, an external application may access and modify data on a computing system and may perform tasks in conjunction with the computing system.

An API reference, API guide and/or API documentation may be used to define how an external application may interact with a computing system via an API. For example, an API reference may define the functions of an API (which may also be referred to as "API functions" or "API methods") that external applications can call or request, and the format of the responses that the computing system will provide. In some embodiments, a computing system may implement multiple APIs, each having a different set of API functions. In the case of an e-commerce platform, non-limiting examples of possible API functions include:
- analytics functions, which may be used to provide detailed reports to help merchants analyze how their business is performing;
- customer functions, which may help manage a merchant's customer data;
- discount functions, which may help offer flexible discounts;
- event functions, which may help fetch event data to keep an external application synced with a merchant's online store;
- inventory functions, which may help manage a merchant's inventory levels across multiple locations;
- online store functions, which may help update a merchant's online storefront and its content;
- order functions, which may help provide new ways to receive, process, and manage orders;
- product functions, which may help access and manipulate a merchant's product catalog; and
- shipping and fulfillment functions, which may help show custom shipping rates at checkout and manage merchant fulfillments.

An aspect of the present disclosure relates to the use of an external application's API permissions and/or API interactions to determine account permissions. These account permissions may be generated for a third-party account that is associated with the external application, for example, by providing support for the external application. The API permissions relate to the API functions that the external application is permitted to call, whereas the API interactions relate to the actual API calls made by the external application. The API interactions and/or the API permissions associated with the external application may be used to determine the "API scope" of the external application. The API scope may indicate the resources of a computing system (including the resources of one or more software instances on the computing system) that are relevant to the external application. As such, in some embodiments, API scope is used to help determine an appropriate scope of account permissions for third-party accounts that are associated with an external application.

Third-party account permissions that are based on an API scope might enable access to resources of a computing system that correspond to the API scope, while restricting access to resources that do not correspond to the API scope. Consider, by way of example, a case in which account permissions are generated for a third-party supporting an external application for an e-commerce platform. If the external application does not use and/or have access to any customer functions of an API implemented by the e-commerce platform, then the external application might not have access to any customer information on the e-commerce platform. As such, the third-party might not need access to a merchant's customer information to provide effective support for the external application, and the account permissions for the third-party might not include access to customer information. In contrast, if the external application uses or is permitted to use one or more product functions of the API, then a third-party may be provided with access to the merchant's product information in order to provide effective support for the external application. From the perspective of the third-party, they may be provided with a collaborator account having access to a screen page that appears similar to the "Product" section of the merchant's administrator. However, any links to the "Customer" section of the merchant's administrator may be disabled for the third-party. Furthermore, any customer data that would usually appear within the "Product" section (for example, a list of recent customers who have purchased a product) may be omitted or obfuscated.

Example Systems and Methods

Figure 4:
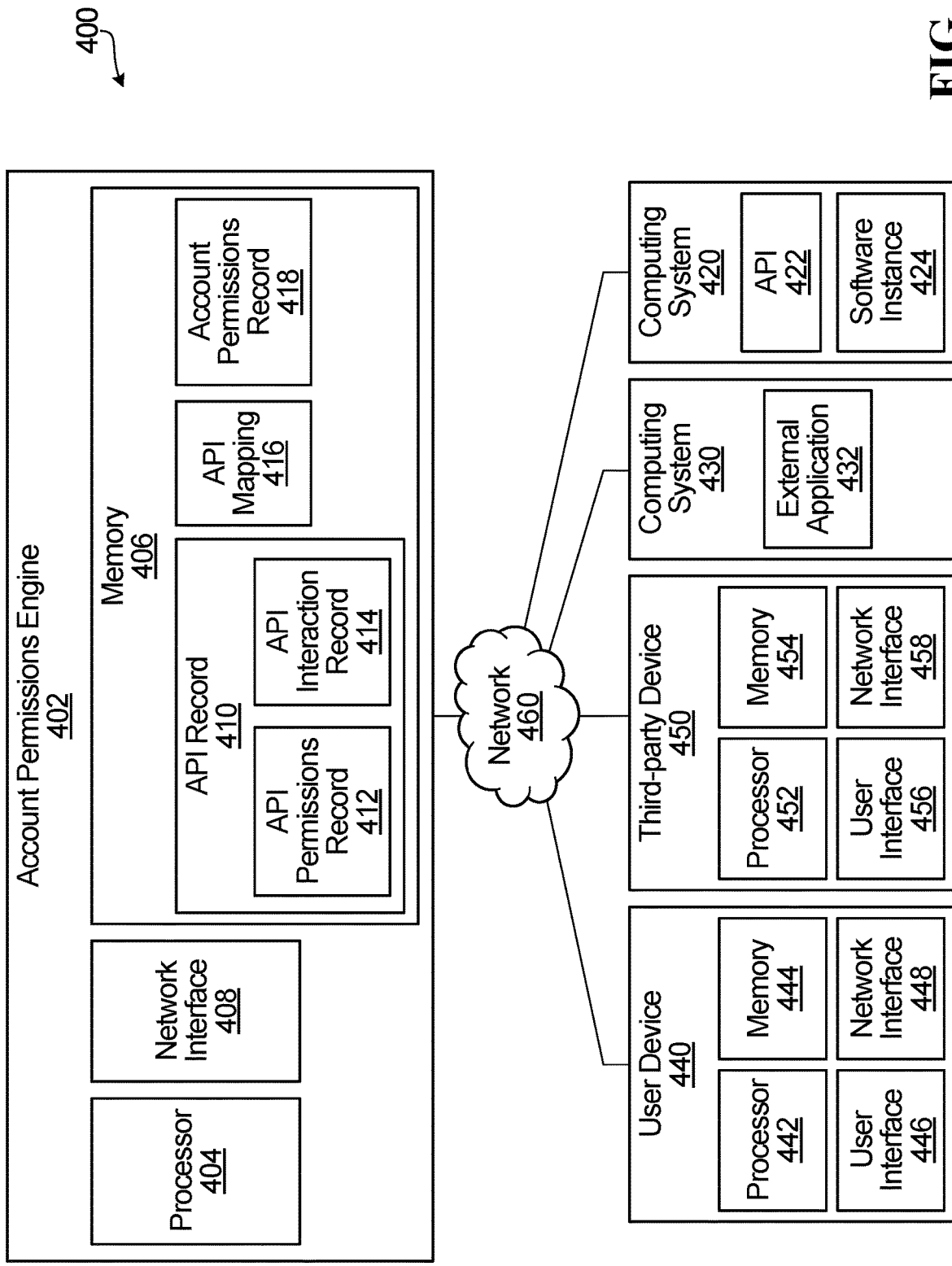
FIG. 4 is a block diagram illustrating a system for generating account permissions based on API scope, according to an embodiment.

FIG. 4 is a block diagram illustrating a system 400 for generating account permissions based on API scope, according to an embodiment. The system 400 includes an account permissions engine 402, a computing system 420, another computing system 430, a user device 440, a third-party device 450 and a network 460.

The computing system 420 supports, hosts or otherwise implements an API 422 and at least one software instance 424. The API 422 is an example of an interface that allows external applications to interact with the computing system 420. The API 422 might actually be a set of multiple APIs implemented by the computing system 420, where each of the APIs may correspond to a different group of API functions. In other embodiments, the API 422 might be replaced with a different type of interface. The software instance 424 is an example of a service instance that is associated with one or more users of the computing system 420. In general, the computing system 420 may implement any number of software instances, which may be associated with different users.

In some implementations, the computing system 420 is or includes an e-commerce platform. In these implementations, the software instance 424 may be an online store supported by the computing system 420, and the user device 440 may be associated with a merchant that owns the online store. For example, the computing system 420 may be similar to the e-commerce platform 100, the software instance 424 may be similar to the online store 138, and the user device 440 may be similar to the merchant device 102.

The computing system 430 is separate from the computing system 420, but supports, hosts or otherwise implements at least one external application 432 that enhances and/or supplements the functionality of the computing system 420. The external application 432 is an example of a software application that interacts with the computing system 420 via the API 422. In some cases, the external application 432 may be installed and implemented by the software instance 424. For example, in the case that the software instance 424 is an online store, the external application 432 may be implemented to provide new and/or improved features for the online store. In general, the computing system 430 may implement any number of software applications, which may be associated with multiple different parties.

The external application 432 may be in some way associated with the third-party device 450. For example, the third-party device 450 may be owned and/or operated by a developer of the external application 432. Alternatively or additionally, the third-party device 450 may be owned and/or operated by support personnel that provide support services for the external application 432.

The structure of the computing systems 420, 430 is implementation specific. The computing systems 420, 430 may include or implement a processor, memory, server, client, network interface, network infrastructure, mobile computing platform, cloud computing platform and/or stationary computing platform, for example.

Either or both of the devices 440, 450 may be a mobile phone, tablet, laptop or computer. As illustrated, the user device 440 includes a processor 442, memory 444, user interface 446 and network interface 448. The third-party device 450 also includes a processor 452, memory 454, user interface 456 and network interface 458. The user device 440 will be described by way of example below. However, it should be noted that the third-party device 450 may be implemented in the same or a similar way.

An example of the user interface 446 is a display screen (which may be a touch screen), a gesture recognition system, a keyboard, and/or a mouse. The network interface 448 is provided for communicating over the network 460. The structure of the network interface 448 will depend on how the user device 440 interfaces with the network 460. For example, if the user device 440 is a mobile phone or tablet, then the network interface 448 may include a transmitter/receiver with an antenna to send and receive wireless transmissions to/from the network 460. If the user device 440 is a personal computer connected to the network with a network cable, then the network interface 448 may include, for example, a network interface card (NIC), a computer port (for example, a physical outlet to which a plug or cable connects), and/or a network socket. The processor 442 directly performs or instructs all of the operations performed by the user device 440. Examples of these operations include processing user inputs received from the user interface 446, preparing information for transmission over the network 460, processing data received over the network 460, and instructing a display screen to display information. The processor 442 may be implemented by one or more processors that execute instructions stored in the memory 444. Alternatively, some or all of the processor 442 may be implemented using dedicated circuitry, such as an application specific integrated circuit (ASIC), a graphics processing unit (GPU) or a programmed field programmable gate array (FPGA).

In FIG. 4, the number of user devices and third-party devices are shown by way of example. Any number of such devices may be implemented in the system 400.

The network 460 may be a computer network implementing wired and/or wireless connections between different devices, including any two or more of the account permissions engine 402, the computing systems 420, 430, the user device 440 and the third-party device 450, for example. The network 460 may implement any communication protocol known in the art. Non-limiting examples of communication protocols include a local area network (LAN), a wireless LAN, an internet protocol (IP) network, and a cellular network.

The account permissions engine 402 is configured to generate account permissions for one or more accounts on the computing system 420. These account permissions may include, but are not limited to, third-party account permissions. The third-party account permissions may enable a third party to access at least some resources of the computing system 420. In some cases, using the third-party account permissions, the third-party may provide users of the computing system 420 with support for the external application 432. For example, the third-party account permissions may allow the third-party device 450 to access the software instance 424 to help provide tailored support to the software instance 424. As discussed in further detail below, third-party account permissions may be generated by the account permissions engine 402 based on an API scope of the external application 432.

As illustrated, the account permissions engine 402 includes a processor 404, memory 406 and a network interface 408. The processor 404 may be implemented by one or more processors that execute instructions stored in the memory 406 or in another computer readable medium. These instructions could implement any method described herein. Alternatively, some or all of the processor 404 may be implemented using dedicated circuitry, such as an ASIC, a GPU, or a programmed FPGA.

The network interface 408 is provided for communication over the network 460. The structure of the network interface 408 is implementation specific. For example, the network interface 408 may include a NIC, a computer port, and/or a network socket.

The memory 406 stores an API record 410, an API mapping 416 and an account permissions record 418. The API record 410 includes both an API permissions record 412 and an API interaction record 414.

The API permissions record 412 stores a list of API permissions for one or more external applications associated with the computing system 420. These external applications may include applications that are implemented by software instances on the computing system 420, such as by the software instance 424, for example. The API permissions associated with an external application (which may also be referred to as "API access" or "API access scopes") define the functions of the API 422 that an external application is authorized to access or call.

The API permissions record 412 includes API permissions for the external application 432. These permissions may be granted by the computing system 420 during a review of the external application 432. For example, before the external application 432 is permitted to access functions of the API 422, the computing system 420 may review the external application 432 to ensure that it meets certain requirements. During the review, the computing system 420 may grant a set of API permissions to the external application 432 based on the functions of the API 422 that the external application 432 needs or intends to use. Alternatively or additionally, API permissions may be granted by users of the computing system 420 when purchasing and/or implementing the external application 432. For example, a user associated with the software instance 424 may grant the external application 432 access to certain resources of the software instance 424 in order to use the external application 432.

Consider, for example, a case in which the computing system 420 is an e-commerce platform and the external application 432 performs sales analytics for merchants. During a review of the external application 432, the computing system 420 may determine the API permissions that the external application 432 will require to implement its sales analytics. For example, the API permissions may include access to sales functions and analytics functions of the API 422 that allow the external application 432 to read and/or write sales information on the computing system 420.

API permissions can be defined at any level of granularity. In some cases, a third-party developer of the external application 432 may request access to each desired function of the API 422 individually. In other cases, the third-party developer may request access to all functions in the API 422, which may include some functions that the external application 432 does not actually call.

API permissions may alternatively be granted using a workflow-based (or taskflow-based) approach. In a workflow-based approach, a group of API functions may be defined for different types of workflow at the computing system 420. Consider, once again, the case in which the computing system 420 is an e-commerce platform and the external application 432 performs sales analytics for merchants. A group of API functions for sales analytics may be defined by the computing system 420. The third-party developer of the external application 432 may request access to this group of API functions, which provides the external application 432 with access to most or all of the functions of the API 422 that might be required to perform a sales analysis workflow.

While API permissions may indicate the API functions that an external application is permitted to call, API permissions might not directly correspond to the actual API functions that the external application calls in practice. API interactions, on the other hand, may provide an indication of the actual API functions called by an external application.

The API interaction record 414 record stores a list of API interactions involving the API 422 and external applications, including but not limited to the external application 432. The API interactions may be determined by monitoring or tracking the API calls received by the API 422 from devices that execute external applications. This may include tracking the functions of the API 422 accessed in the API calls, tracking the timing or sequence of the API calls, tracking the content included in the API calls, and/or tracking the content of the responses from the computing system 420. Any, some or all of the information obtained from tracking the API calls may be stored by the API interaction record 414. In this way, the API interaction record 414 indicates the actual API calls generated by an external application.

In some implementations, the API interaction record 414 may store API interactions using a workflow-based approach. A sequence of API calls may be defined for different types of workflow at the computing system 420. An external application that sends API calls in the same or a similar sequence as a given workflow may be considered to implement this workflow. Recording and analysing the content of the API calls made by an external application may provide an indication of the workflows being implemented by that external application. For example, if the software instance 424 is an online store and an orders function of the API 422 is being used by the external application 432 to modify the status of orders in the online store (for example, changing the status of orders from "unfulfilled" to "fulfilled"), then the external application 432 might be implementing a fulfillment-based workflow, rather than a workflow that relates to other aspects of the orders function.

In some implementations, the API interaction record 414 is organized in terms of the different software instances of the computing system 420. For example, the API calls made by one or more external applications that pertain to resources of the software instance 424 may be organized in a record that is specific to the software instance 424. As such, the API interaction record 414 may include different records of API interactions for different software instances, which may help tailor third-party account permissions for a software instance. For example, some external applications may execute multiple workflows that are not all used by every software instance on the computing system 420. Some software instances may only use a subset of the workflows. The subset of workflows used by a software instance may be apparent or inferable from the API interactions that relate to the software instance. In this way, a record of API interactions that is specific to a particular software instance may indicate the actual workflows of an external application that the software instance uses, regardless of the other capabilities of the external application and/or what features other software instances may use.

Consider the case in which the computing system 420 is an e-commerce platform and the external application 432 performs a sales analytics workflow for merchants. The external application 432 might also perform a workflow that relates to customer analytics, but the software instance 424 might only utilize the workflow for sales analytics (for example, through enablement settings available to the user of the software instance 424 through the external application 432). Here, the API interactions related to the software instance 424 may indicate that the external application 432 is only implemented by the software instance 424 for the sales analytics workflow.

While the API permissions record 412 and the API interaction record 414 are shown separately in FIG. 4, it should be noted that these records might instead be combined into a single record. For example, API permissions and API interactions may be stored together in a single record that is optionally specific to a single external application and/or to a single software instance.

The API record 410 may be used to determine the API scope of an external application for the computing system 420, such as the external application 432, for example. This API scope may be determined based on one or both of the API permissions record 412 and the API interaction record 414.

The API mapping 416 defines one or more relationships that associate API scope and account permissions on the computing system 420. In some implementations, the API mapping 416 includes one or more functions, models and/or lookup tables to define these relationships. Once the API scope for an external application is determined, the API mapping 416 may be used to help obtain a corresponding set of account permissions for a third-party associated with the external application.

In some implementations, the API mapping 416 includes (or is at least based on) a mapping between portions of the API 422 (which may also be referred to as "API surface area") and resources of the computing system 420. This mapping may indicate the resources of the computing system 420 that correspond to the different functions of the API 422. For example, each function of the API 422 may enable access to one or more resources provided by the computing system 420. The resources that each function of the API 422 provides access to may be specified by the API mapping 416.

The API mapping 416 may also or instead include a mapping of portions of the API 422 to workflows on the computing system 420. For example, groups or sequences of API functions may be mapped to a workflow on the computing system 420. The workflow might then be mapped to a set of resources on the computing system 420 that enable the workflow.

Consider an example in which the computing system 420 is an e-commerce platform. Product functions of the API 422 may interact with the "Merchandising" and "Product" sections of a merchant's administrator on the computing system 420, allowing new products and product variants to be created and allowing for adjustments of quantity and location of inventory. In this way, the "Merchandising" and "Product" sections of the merchant's administrator are resources that may be mapped to the product functions of the API 422. In some cases, the "Merchandising" and "Product" sections of the merchant's administrator may be mapped to different product functions of the API 422. For example, the function of the API 422 to adjust inventory may map to the "Merchandising" section only, while the function of the API 422 to create a new product may map to the "Product" section only. In another example, a customer function of the API 422 may map to the "Customer" section of the merchant's administrator on the computing system 420.

In addition to mapping the API scope of an external application to a set of resources and/or a workflow of the computing system 420, the API mapping 416 may also relate the set of resources and/or the workflow to account permissions for an account on the computing system 420. In this way, the account permissions for a third-party supporting an external application may be determined based on the API scope of the external application. These account permissions may provide the third-party with access to a set of resources corresponding to the API scope of the external application. For example, when the computing system 420 is an e-commerce platform and the API scope of external application 432 includes customer functions of the API 422, the account permissions for a third-party providing support for the external application 432 may enable access to the "Customer" section of a merchant's administrator.

In some implementations, the API mapping 416 may include multiple separate mappings. One mapping may relate portions of the API 422 to resources and/or workflows on the computing system 420, and another mapping may relate resources and/or workflows on the computing system 420 to account permissions.

One or more of the mappings included in the API mapping 416 may be generated manually. Alternatively or additionally, an algorithm may be used. In some implementations, this algorithm is an enumeration algorithm that generates a set of possible resources corresponding to a given API function. In some implementations, the algorithm may be a machine learning (ML) model or another form of artificial intelligence (AI), which can learn from previous, manually generated account permissions. For example, an ML model may be trained using a training data set that includes API interactions and/or API permissions associated with multiple external applications, and manually generated account permissions for third-parties supporting the external applications. The trained ML model may then use API interactions and/or API permissions as an input to generate account permissions. Non-limiting examples of ML model structures include artificial neural networks, decision trees, support vector machines, Bayesian networks, and genetic algorithms. Non-limiting examples of training methods for an ML model include supervised learning, unsupervised learning, reinforcement learning, self-learning, feature learning, and sparse dictionary learning.

The account permissions record 418 includes a list of account permissions for one or more accounts on the computing system 420. At least some of these account permissions may be generated by the account permissions engine 402 using the API record 410 and/or the API mapping 416, for example.

In some implementations, third-party account permissions are stored in the account permissions record 418. These third-party account permissions may be determined based on an API scope of a corresponding external application. For example, if a third-party account is used to provide support for the external application 432, then the account permissions for this third-party account may be obtained based on the API scope of the external application 432.

In some implementations, third-party account permissions may be generated in a software instance-specific manner. For example, third-party account permissions associated with the external application 432 may be generated based only on the API interactions involving the external application 432 and the software instance 424. API interactions involving other software instances may be disregarded.

As noted above, API interactions may be determined in a workflow-specific manner, and therefore third-party account permissions may also be generated based on the workflows that have been observed to be used by an external application. Workflow-based third-party permissions may be determined based on interactions observed across all software instances on the computing system 420. Alternatively, workflow-based third-party permissions may be determined in a manner that is specific to a software instance, as described above. Consider the case in which the computing system 420 is an e-commerce platform and the software instance 424 is a merchant's online store. If the merchant only utilizes some workflows of the external application 432, then a third-party that is providing support for the external application 432 might only need access to the portions of the online store that correspond to the workflows actually used by the merchant. The third-party might be restricted from other portions of the online store, even if the external application 432 does access these portions of other online stores on the e-commerce platform.

Third-party account permissions that are based on an API scope may dictate whether or not a third-party has access to certain data on the computing system 420. Consider the case in which the computing system 420 is an e-commerce platform and the software instance 424 is a merchant's online store. Even if a third-party is able to access the "Customer" section of the merchant's online store, the third-party may not be able to access all of the customer information contained in that section. Any, some or all of the customer information may be masked, scrambled or replaced with fake information. The customer information may be protected at any of a variety of different levels of granularity. For example, the third-party may be able to access customer shipping information on the "Customer" section, while all of the other customer information is masked.

A third-party's access to personally identifiable information (PII) and/or other personal information in the computing system 420 may be determined based on an API scope. In some cases, third-party account permissions might only include access to PII if the API scope of a corresponding external application includes certain functions of the API 422. For example, in the case that the computing system 420 is an e-commerce platform and the software instance 424 is a merchant's online store, an API scope for the external application 432 may include order functions of the API 422 that provides access to the "Orders" page of the merchant's online store. However, if the API scope does not include customer functions of the API 422, then the "Orders" page might not reveal any customer PII that would normally be included in the "Orders" page.

In some implementations, a third-party's access to data on the computing system 420 may be restricted to a certain time period. For example, third-party account permissions may only allow access to data that was collected within a time period of 30 days, in order to avoid granting the third-party access to a complete data set. A time period for third-party data access may be determined based on the API permissions for an external application. For example, API permissions for the external application 432 may indicate that the external application 432 has only been permitted to call a particular function of the API 422 for one year. In this example, the account permissions for a third-party that is supporting the external application 432 may only enable access to data associated with the particular function of the API 422 that was collected over that year.

API interactions associated with an external application may also or instead be used to determine one or more time periods for accessing data. For example, API interactions may indicate a time period during which the external application 432 actually accessed data using a particular function of the API 422. Third-party account permissions might then limit access to data associated with this particular function of the API 422 to the same time period.

Alternatively or additionally, a time period for restricting data access may be determined based on the date that an external application was installed and/or registered with the computing system 420 or with a particular software instance on the computing system 420. For example, if the external application 432 was installed by the software instance 424 only one week ago, then the third-party account permissions associated with the external application 432 may only enable access to the software instance's data that was collected within that week.

Advantageously, the API record 410 may provide an objective indication of suitable third-party account permissions. The use of API scopes derived from the API record 410 might reduce or even eliminate reliance on human judgement to generate account permissions, and therefore may be less prone to providing account permissions that are too broad or too narrow. Moreover, API scopes may allow third-party account permissions to be automatically generated using the API mapping 416. For example, in the event that a third-party requests an account to provide technical support for the external application 432, the API permissions record 412, the API interaction record 414 and/or the API mapping 416 could be accessed and used to determine account permissions for the third-party with minimal or even no manual intervention. The API permissions record 412 and/or API interaction record 414 may be updated over time as the external application 432 is granted permissions to call other functions of the API 422 and/or as new API calls are received from the external application 432. Third-party account permissions may then be automatically updated as the API permissions record 412 and/or API interaction record 414 change.

Other implementations of the account permissions engine 402 are also contemplated. In some implementations, the account permissions engine 402 is at least partially provided by the computing system 420, either as a core function of the computing system 420 or as an application or service supported by the computing system 420. In some implementations, the account permissions engine 402 is implemented at least in part by a user device, such as the user device 440, for example. In some implementations, the account permissions engine 402 is implemented as a stand-alone service to generate and manage account permissions. While the account permissions engine 402 is shown as a single component, an account permissions engine could instead be provided by multiple different components that are in communication via a network.

Figure 5:
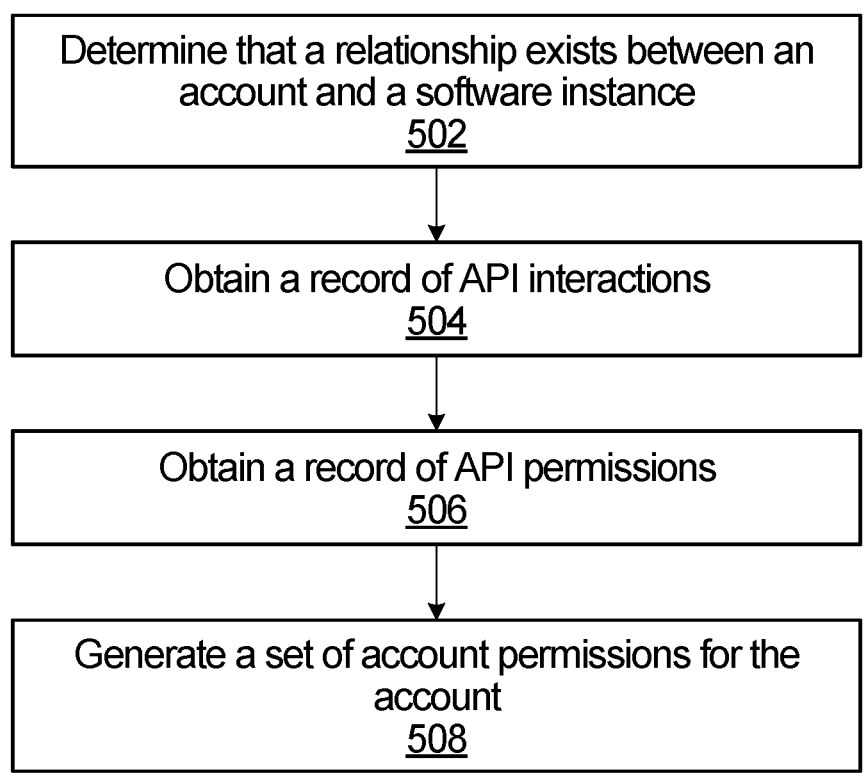
FIG. 5 is a flow diagram illustrating a method for generating account permissions based on API scope, according to an embodiment.

FIG. 5 is a flow diagram illustrating a method 500 for generating account permissions based on API scope, according to an embodiment. The method 500 will be described as being performed by the account permissions engine 402 to generate a set of account permissions for an account on the computing system 420. However, it should be noted this is only one example implementation of the method 500.

The account on the computing system 420 may allow a third-party or another user to access at least some resources of the computing system 420. For example, the account may be a collaborator account for the computing system 420. In some implementations, the third-party device 450 may login to the account to access the computing system 420. The set of account permissions may define the degree of user access during a user account session on the computing system 420.

In some implementations, the set of account permissions generated using the method 500 might relate, at least in part, to the software instance 424 on the computing system 420. For example, the set of account permissions may allow the account to access at least a portion of the software instance 424. Before generating the set of account permissions that enables access to the software instance 424, the accounts permissions engine 402 may perform optional step 502 to determine whether or not a relationship exists between the software instance 424 and the account. An example of such a relationship is the account being used to provide the software instance 424 with support for the external application 432. In this example, the software instance 424 (or a user associated with the software instance 424) may install and/or implement the external application 432 and encounter an issue with the external application 432.

Step 502 could include the processor 404 determining that the software instance 424 implements the external application 432 and that the account corresponds to a developer of the external application 432. Alternatively or additionally, step 502 may include the processor 404 determining that the account is associated with a support service for the external application 432. Messages and/or other online activity between the account and the software instance 424 may be analysed to determine that the software instance 424 has engaged with the account (or a third-party associated with the account) to obtain support for the external application 432. Alternatively or additionally, step 502 may include the processor 404 receiving an explicit confirmation that a relationship exists between the software instance 424 and the account. This confirmation may be generated and/or transmitted to the account permissions engine 402 using the user device 440, for example.

It should be noted that step 502 might not be performed in all implementations of the method 500. For example, the set of account permissions may relate to all software instances on the computing system 420, or not relate to any specific software instances. As such, there might be no need to determine if any relationships exist between the external application 432 and individual software instances.

Step 504 includes the processor 404 obtaining a record of API interactions involving the external application 432 accessing a first set of resources of the computing system 420. This record of API interactions may be obtained from the API interaction record 414, for example. It should be noted that the first set of resources might not be all of the resources of the computing system 420, but might instead be a subset of the overall resources of the computing system 420. For example, the first set of resources may include data that is accessible via API calls in the record of API interactions, but may not include data that is not accessible via the API calls in the record of API interactions. The first set of resources may pertain to one or more software instances on the computing system 420.

In some implementations, the record of API interactions is obtained by monitoring API calls received by the computing system 420 from the computing system 430 (and/or another external device) that is executing the external application 432. Monitoring the API calls may include monitoring the functions of the API 422 accessed in the API calls, monitoring the time period or sequence of the API calls, monitoring the content included in the API calls, and/or monitoring the content of the responses from the computing system 420.

Step 506 includes the processor 404 obtaining a record of API permissions for the external application 432. This record of API permissions may be obtained from the API permissions record 412, for example. In some implementations, the record of API permissions may indicate a second set of resources of the computing system 420 that the external application 432 has access to via the API 422, which might be a subset of the overall resources of the computing system 420. It should be noted that there may be at least some overlap between the first set of resources and the second set of resources.

Step 508 includes the processor 404 generating the set of account permissions for the account based on the record of API interactions obtained in step 504 and/or the based on the record of API permissions obtained in step 506. When step 508 is based on the record of API interactions, the set of account permissions might allow the account to access the first set of resources of the computing system 420. The set of account permissions may also or instead restrict the account's access to other resources of the computing system 420 that do not correspond to the record of API interactions. Similarly, when step 508 is based on the record of API permissions, the set of account permissions may allow the account to access the second set of resources of the computing system 420 and/or may restrict the account's access to other resources of the computing system 420 that do not correspond to the record of API permissions.

It should be noted that step 508 may be performed based on only the record of API interactions obtained in step 504 or based on only the record of API permissions based on step 506, and therefore only one of steps 504, 506 might be performed in the method 500.

In some implementations, step 508 includes mapping the record of API interactions to the first set of resources. This mapping may be performed based on the API mapping 416 and/or another stored mapping between portions of the API 422 and resources of the computing system 420. These portions of the API 422 may include, but are not limited to, different functions of the API 422. According to one example, step 508 may include mapping a particular API interaction in the record of API interactions to a particular resource of the first set of resources, and adding at least one permission to the set of account permissions that enables the account to access the particular resource. This may be performed for each API interaction in the record of API interactions to form the set of account permissions. However, it should be noted that some API interactions might not map to a resource on the computing system 420 and/or some API interactions might map to the same resources of the computing system 420. Therefore, some API interactions in the record of API interactions might not contribute to the set of account permissions.

Step 508 is not limited to mapping individual API interactions to resources of the computing system 420. For example, in some cases, step 508 may include mapping a group of API interactions in the record of API interactions to a workflow of the computing system 420 and adding at least one permission to the set of account permissions that enables the account to perform the workflow. This mapping may be performed based on the API mapping 416 and/or another stored mapping between portions of the API 422 and workflows of the computing system 420.

In some implementations, a particular API interaction (or group of API interactions) in the record of API interactions corresponds to a resource that enables access to a data set on the computing system 420. The particular API interaction may also have an associated time period. For example, the record of API interactions may indicate that the external application 432 has only been using the particular API interaction to access the data set for a time period of days, weeks, months or years. The set of account permissions might then only enable access to the portions of the data set that correspond to the time period. For example, at least one account permission in the set of account permissions may enable access to the data set but limit the account's access to portions of the data set that correspond to the time period. In this way, the at least one account permission might only allow the account to access data that the external application 432 has also been able to access via the API 422. This could avoid disclosing more data than has been previously disclosed.

In some implementations, step 508 includes mapping the record of API permissions to the second set of resources and/or to a workflow on the computing system 420. This mapping may be performed using the API mapping 416, and/or using another stored mapping between portions of the API 422 and resources and/or workflows on the computing system 420. For example, step 508 may include mapping a particular API permission in the record of API permissions to a particular resource of the second set of resources, and adding at least one permission to the set of account permissions that enables the account to access the particular resource. Alternatively or additionally, step 508 may include mapping a group of API permissions in the record of API permissions to a workflow of the computing system 420, and adding at least one permission to the set of account permissions that enables the account to perform the workflow.

In some implementations, the record of API permissions includes a particular API permission that enables access to a data set on the computing system 420. If the record of API permissions also includes a time period for that particular API permission, then at least one permission in the record of account permissions may limit the account's access to portions of the data set that correspond to the time period.

As noted above, the set of account permissions generated in step 508 may allow the account to access the software instance 424. In some implementations, the set of account permissions may be specific to or limited to the software instance 424. For example, the first set of resources and/or the second set of resources may be specific to the software instance 424. As such, the set of account permissions might not allow access to other software instances on the computing system 420.

In some implementations, the set of account permissions determined in step 508 may form only a portion of the overall account permissions for the account. For example, if the account is associated with a particular user, then user-specific account permissions may be layered onto the set of account permissions. The user-specific account permissions may supplement and/or limit account permissions in the set of account permissions.

In the case that the set of account permissions is generated to allow the account to provide the software instance 424 with support for the external application 432, the set of account permissions may be terminated after a period of time. For example, after a user's issue with the external application 432 has been resolved, the accounts permissions engine 402 may terminate the set of account permissions for the account.

Advantageously, the method 500 may enable account permissions to be generated automatically by the accounts permissions engine 402, with minimal to no human involvement. This may increase the speed at which account permissions can be generated and may also remove human bias that can negatively affect the generation of account permissions. Further, the use of API interactions and/or API permissions may provide a suitable scope for the set of account permissions.

FURTHER EXAMPLES

Figure 6:
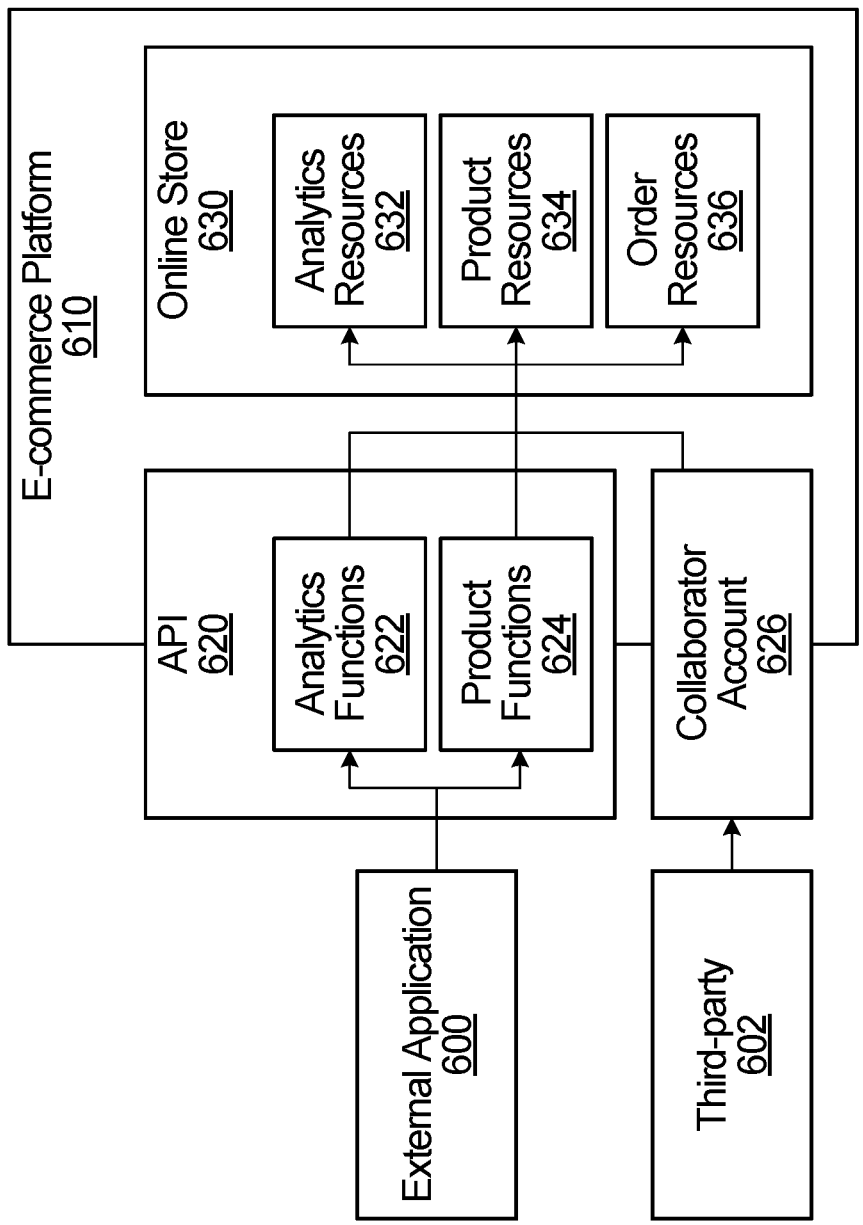
FIG. 6 is a block diagram illustrating an external application and a third-party interacting with an e-commerce platform, according to an embodiment.

FIG. 6 is a block diagram illustrating an external application 600 and a third-party 602 interacting with an e-commerce platform 610, according to an embodiment. In the illustrated example, the external application 600 provides a sales analytics workflow for online stores on the e-commerce platform 610, including an online store 630. To perform the sales analytics workflow, the external application 600 calls analytics functions 622 and product functions 624 of an API 620 provided by the e-commerce platform 610. The analytics functions 622 and product functions 624 enable access to analytics resources 632, product resources 634 and order resources 636 of the online store 630. The external application 600 might write to and/or read the resources 632, 634, 636 of the online store 630 when performing its sale analytics workflow.

The third-party 602 can also access the analytics resources 632, the product resources 634 and the order resources 636 of the online store 630 via a collaborator account 626. For example, the third-party 602 may use a device to login to the collaborator account 626 and access the resources 632, 634, 636. In some implementations, the third-party 602 provides support for the external application 600 and is provided with the collaborator account 626 to more effectively provide this support. For example, accessing the resources 632, 634, 636 may allow the third-party 602 to better understand an issue that a merchant associated with the online store 630 is facing when using the external application 600 and/or to help the merchant correct the issue.

In some implementations, the account permissions for the collaborator account 626 are generated using the method 500 of FIG. 5. For example, a record of API interactions involving the external application 600 and the e-commerce platform 610 may be obtained in step 504 of the method 500. Alternatively or additionally, a record of API permissions granted to the external application 600 may be obtained in step 506 of the method 500. The record of API interactions and/or the record of API permissions may be used to determine an API scope of the external application 600. As illustrated, the external application 600 has access to the analytics functions 622 and the product functions 624 of the API 620, and calls these functions to implement its sales analytics workflow. As such, the API scope of the external application 600 might include the analytics functions 622 and the product functions 624. In step 508 of the method 500, this API scope may be mapped to the analytics resources 632, the product resources 634 and the order resources 636 of the online store 630. The account permissions for the collaborator account 626 might then be generated to include access to the resources 632, 634, 636 of the online store 630, and potentially restrict access to other resources of the online store 630.

In some implementations, the account permissions generated using the method 500 might be specific to the online store 630. For example, the collaborator account 626 might not have access to analytics resources, product resources and order resources of other online stores.

In some implementations, the API scope of the external application 600 might only include a subset of the resources 632, 634, 636 of the online store 630, rather than the entirety of the resources 632, 634, 636. Similarly, the account permissions for the collaborator account 626 may only enable access to the same subset of the resources 632, 634, 636.

In some implementations, before generating the account permissions for the collaborator account 626, step 502 of the method 500 is performed to confirm that a relationship exists between the collaborator account 626 and the online store 630. Step 502 may include determining that the collaborator account 626 is used by the third-party 602 to provide the online store 630 with support for the external application 600. In one example, the external application 600 may have been developed by the third-party 602. The relationship between the collaborator account 626 and the online store 630 might then be established based on the knowledge that the online store 630 is using the external application 600 developed by the third-party 602, and the collaborator account 626 is associated with the third-party 602. In another example, the third-party 602 provides support services for the external application 600. The relationship between the collaborator account 626 and the online store 630 may be evidenced by a merchant of the online store 630 engaging with the third-party 602 to obtain the support services. For example, the relationship may be established based on the merchant's activity on a marketplace for application support in the e-commerce platform 610 and/or through messages between the merchant and the third-party 602. If no relationship between the online store 630 and the third-party 602 can be automatically determined, then the merchant of the online store 630 may be asked to provide an explicit confirmation that the third-party 602 should be granted access to the online store 630.

Figure 7:
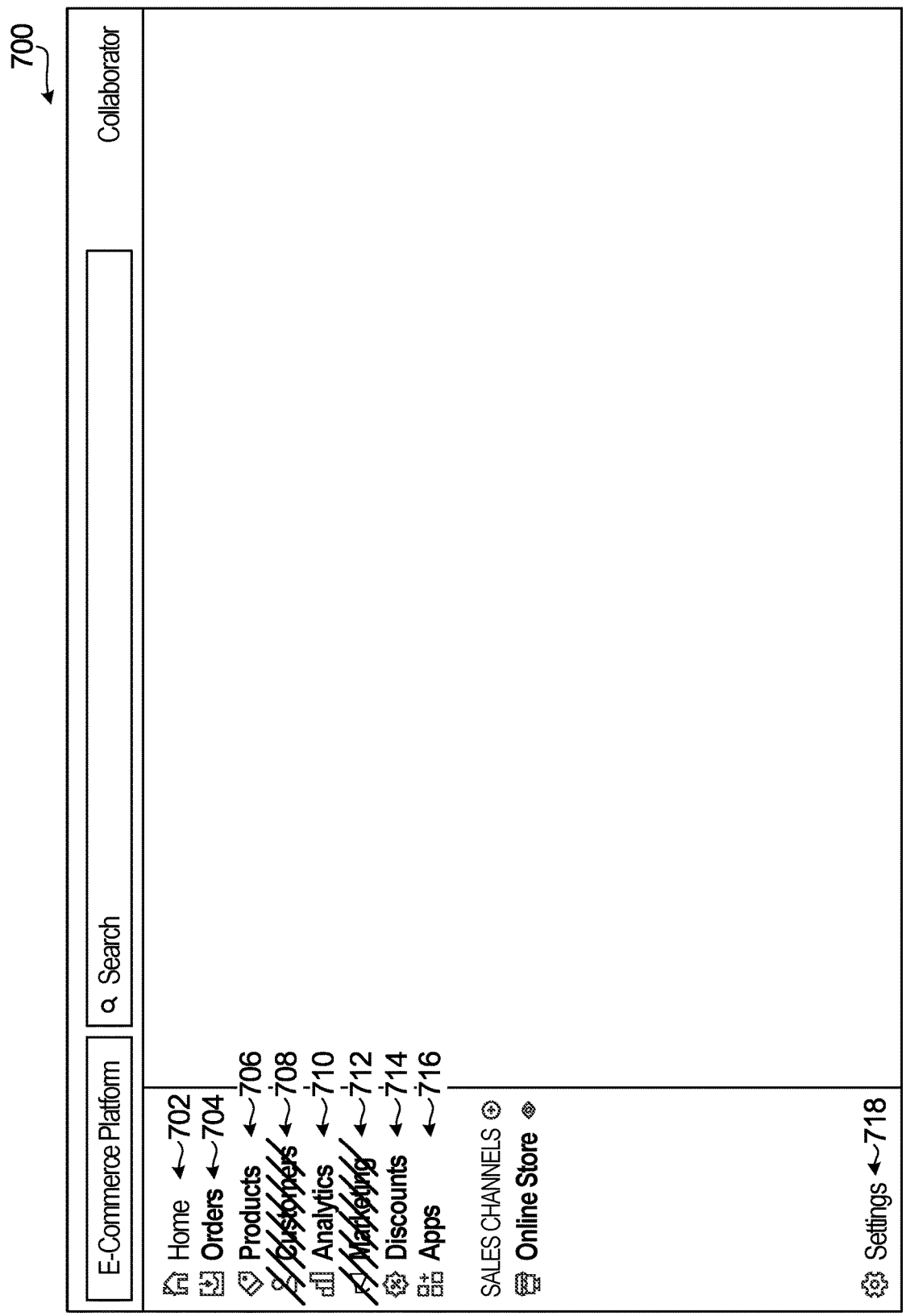
FIGS. 7 and 8 illustrate example screen pages that are accessible by a third-party using a collaborator account on the e-commerce platform of FIG. 6.
Figure 8:
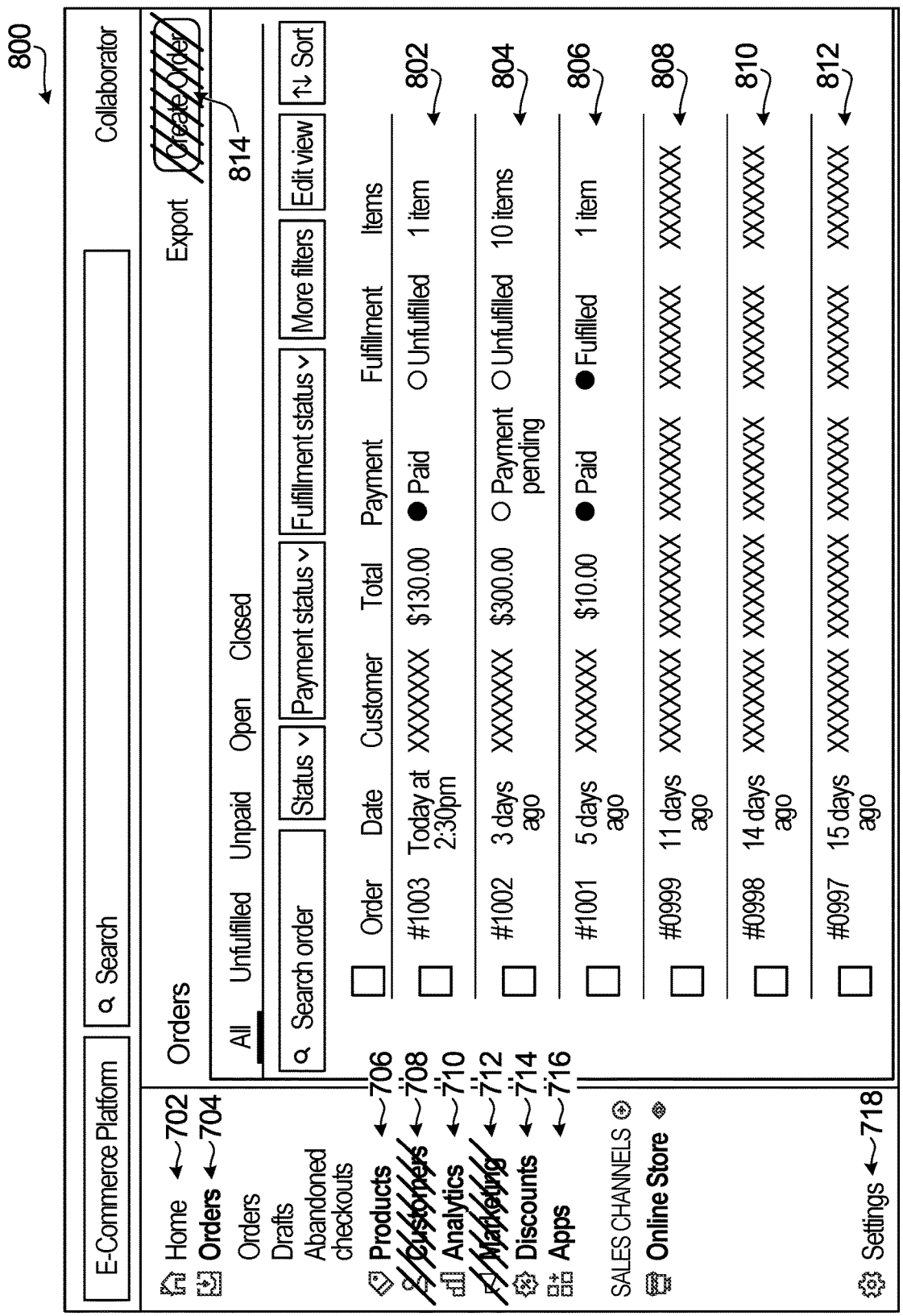

FIGS. 7 and 8 illustrate example screen pages that are accessible by the third-party 602 using the collaborator account 626 on the e-commerce platform 610. These screen pages provide access to at least some of the analytics resources 632, the product resources 634 and the order resources 636 of the online store 630.

FIG. 7 illustrates an example of a home page 700 of the administrator of the online store 630 that is accessed using the collaborator account 626. The home page 700 includes an option 702 to access the home page 700, an option 704 to access an orders page, an option 706 to access a products page, an option 708 to access a customers page, an option 710 to access an analytics page, an option 712 to access a marketing page, an option 714 to access a discounts page, an option 716 to access an applications page, and an option 718 to access a settings page.

In the illustrated example, the options 702, 704, 706, 710, 714, 716 are enabled on the home page 700. Therefore, in addition to the home page 700, the collaborator account 626 has access to the orders page, the products page, the analytics page, the discounts page, the applications page and the settings page of the administrator of the online store 630. This access may have been provided because the options 702, 704, 706, 710, 714, 716 include or otherwise relate to the analytics resources 632, the product resources 634 and the order resources 636 of the online store 630.

The options 708, 712 are not enabled on the home page 700, which is illustrated using hatching over the options 708, 712. As such, the collaborator account 626 does not have access to the customers page and the marketing page of the administrator. This might be because the analytics resources 632, the product resources 634 and the order resources 636 of the online store 630 do not map to the customers page or to the marketing page, and therefore the account permissions for the collaborator account 626 were generated to exclude access to these pages.

While the collaborator account 626 has access to the home page 700, the orders page, the products page, the analytics page, the discounts page, the applications page and the settings page of the administrator, these pages might not include all of the data or other content that would normally be included on these pages. A different home page may be shown to a merchant of the online store 630, which might include additional content not shown on the home page 700. An example of a home page shown to a merchant is illustrated in FIG. 2.

FIG. 8 illustrates an example of an orders page 800 of the administrator of the online store 630 that is accessed using the collaborator account 626. The orders page 800 may have been navigated to from the home page 700 using the option 704, for example. The orders page 800 includes a record of multiple orders 802, 804, 806, 808, 810, 812 received by the online store 630, which is an example of the order resources 636 of the online store 630. The orders page 800 also includes an option 814 to create a new order, which is not enabled for the collaborator account 626. For example, the account permissions for the collaborator account 626 might not include access to creating new orders.

The orders page 800 only provides some of the information pertaining to the orders 802, 804, 806, 808, 810, 812. For example, the customer information is masked for each of the orders 802, 804, 806, 808, 810, 812. The customer information may be masked because the API scope of the external application 600 does not map to customer resources of the online store 630, and therefore the account permissions for the collaborator account 626 do not enable access to customer resources.

Further, the orders page 800 only shows some types of data within a particular time period. As illustrated, the total cost, payment, fulfillment status and number of items for the orders 802, 804, 806 are displayed on the orders page 800. However, this same information is masked for the orders 808, 810, 812. The total cost, payment, fulfillment status and number of items for the orders 808, 810, 812 may have been masked because the API scope of the external application 600 is limited to a period of 7 days. For example, the external application 600 may have only been installed by the online store 630 for 7 days. The account permissions for the collaborator account 626 might therefore not enable access to some data that was obtained outside of the 7-day time period.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A computer-implemented method comprising:
obtaining a record of application programming interface (API) interactions involving a software application accessing a set of resources of a computing system, wherein the record of API interactions is based on API calls received by the computing system from an external device that is separate to the computing system; and
generating a set of account permissions for an account based on the record of API interactions, the set of account permissions allowing that account to access the set of resources of the computing system.

2. The computer-implemented method of claim 1, wherein generating the set of account permissions for the account comprises:
mapping a particular API interaction in the record of API interactions to a particular resource of the set of resources of the computing system; and
adding at least one permission to the set of account permissions that enables the account to access the particular resource.

3. The computer-implemented method of claim 2, wherein mapping the particular API interaction to the particular resource is based on a stored mapping between portions of an API and resources of the computing system.

4. The computer-implemented method of claim 2, wherein:
obtaining the record of API interactions comprises obtaining a time period for the particular API interaction;
the particular resource enables access to a data set on the computing system; and
the at least one account permission limits the account's access to portions of the data set that correspond to the time period.

5. The computer-implemented method of claim 1, wherein generating the set of account permissions for the account comprises:
mapping a group of API interactions in the record of API interactions to a workflow of the computing system; and
adding at least one permission to the set of account permissions that enables the account to perform the workflow.

6. The computer-implemented method of claim 5, wherein mapping the group of API interactions to the workflow is based on a stored mapping between portions of an API and workflows of the computing system.

7. The computer-implemented method of claim 1, wherein the set of account permissions restricts the account's access to other resources of the computing system that do not correspond to the record of API interactions.

8. The computer-implemented method of claim 1, wherein the set of resources includes data that is accessible via the API calls in the record of API interactions.

9. The computer-implemented method of claim 1, wherein the account allows a user to access the computing system.

10. The computer-implemented method of claim 1, wherein the set of account permissions allows the account to access a software instance on the computing system that is associated with the software application.

11. The computer-implemented method of claim 10, further comprising:
before generating the set of account permissions, determining that a relationship exists between the software instance and the account.

12. The computer-implemented method of claim 10, wherein:
the set of resources is specific to the software instance; and
the set of account permissions is limited to the software instance.

13. The computer-implemented method of claim 1, wherein obtaining the record of API interactions comprises monitoring the API calls received by the computing system from the external device when the external device is executing the software application.

14. The computer-implemented method of claim 1, further comprising:
obtaining a record of API permissions for the software application,
wherein generating the set of account permissions for the account is further based on the record of API permissions.

15. A system comprising:
memory to store a record of application programming interface (API) interactions involving a software application accessing a set of resources of a computing system, wherein the record of API interactions is based on API calls received by the computing system from an external device that is separate to the computing system; and
at least one processor to generate a set of account permissions for an account based on the record of API interactions, the set of account permissions allowing that account to access the set of resources of the computing system.

16. The system of claim 15, wherein the at least one processor is to:
map a particular API interaction in the record of API interactions to a particular resource of the set of resources of the computing system; and
add at least one permission to the set of account permissions that enables the account to access the particular resource.

17. The system of claim 16, wherein:
the memory is further to store a mapping between portions of an API and resources of the computing system; and
the mapping is used by the at least one processor to map the particular API interaction to the particular resource.

18. The system of claim 16, wherein:
the record of API interactions comprises a time period for the particular API interaction;
the particular resource enables access to a data set on the computing system; and
the at least one account permission limits the account's access to portions of the data set that correspond to the time period.

19. The system of claim 15, wherein the at least one processor is to:
map a group of API interactions in the record of API interactions to a workflow of the computing system; and
add at least one permission to the set of account permissions that enables the account to perform the workflow.

20. The system of claim 19, wherein:
the memory is further to store a mapping between portions of an API and workflows of the computing system; and
the mapping is used by the at least one processor to map the group of API interactions to the workflow.

21. The system of claim 15, wherein the set of account permissions allows the account to access a software instance on the computing system that is associated with the software application.

22. The system of claim 21, wherein the at least one processor is further to determine that a relationship exists between the software instance and the account before the set of account permissions is generated.

23. The system of claim 21, wherein:
the set of resources is specific to the software instance; and
the set of account permissions is limited to the software instance.

24. The system of claim 15, wherein the record of API interactions is based on the API calls received by the computing system from the external device when the external device is executing the software application.

25. A non-transitory computer readable medium storing computer executable instructions which, when executed by a computer, cause the computer to:
obtain a record of application programming interface (API) interactions involving a software application accessing a set of resources of a computing system, wherein the record of API interactions is based on API calls received by the computing system from an external device that is separate to the computing system; and
generate a set of account permissions for an account based on the record of API interactions, the set of account permissions allowing that account to access the set of resources of the computing system.

* * * * *